United States Patent

Scwartz

[11] Patent Number: 5,093,862
[45] Date of Patent: Mar. 3, 1992

[54] DATA CARRIER-CONTROLLED TERMINAL IN A DATA EXCHANGE SYSTEM

[75] Inventor: Hermann Scwartz, Pfäffikon, Switzerland

[73] Assignee: SPA Syspatronic AG, Zug, Switzerland

[21] Appl. No.: 381,510

[22] Filed: Jul. 18, 1989

[30] Foreign Application Priority Data

Jul. 20, 1988 [CH] Switzerland ............ 02777/88

[51] Int. Cl.⁵ .................. H04L 9/32; G07F 7/08
[52] U.S. Cl. ............................... 380/25; 380/4;
380/21; 380/23; 380/50; 235/380; 235/382;
340/825.31; 340/825.34
[58] Field of Search ... 364/200 MS File, 900 MS File;
235/380; 380/2-4, 21, 23-25, 49, 50;
340/825.3-825.34

[56] References Cited

U.S. PATENT DOCUMENTS

| | | | |
|---|---|---|---|
| 3,925,710 | 12/1975 | Ebert | 317/100 |
| 4,450,535 | 5/1984 | DePommery et al. | 364/900 |
| 4,544,833 | 10/1985 | Ugon | 235/379 |
| 4,656,474 | 4/1987 | Mollier et al. | 380/23 |
| 4,672,182 | 6/1987 | Hirokawa | 380/25 X |
| 4,683,550 | 7/1987 | Jindrick et al. | 364/900 |
| 4,683,553 | 7/1987 | Mollier | 380/4 |
| 4,786,790 | 11/1988 | Kruse et al. | 235/380 |
| 4,816,654 | 3/1989 | Anderl et al. | 235/380 |

FOREIGN PATENT DOCUMENTS 0111381 6/1984 European Pat. Off. .
0193920 9/1986 European Pat. Off. .

Primary Examiner—Bernarr E. Gregory

[57] ABSTRACT

A terminal (10) in a data exchange system with exchangeable portable user data carriers (4) has for their connection at least one connecting unit (3) and has further at least one data input unit (5). Exchangeable control modules (8, 9) are connected through one or more other, preferably similar, connecting units (6, 7). The modules are equipped with microprocessors and contain mechanically and cryptographically protected memory areas which receive secret data and keys for the secure carrying out of identity and authenticity tests, as well as application specific operational programs. These construction methods offer high security against unauthorized data access as well as against fraudulent manipulation of the device. They also greatly simplify the application independent design and construction of the terminal.

10 Claims, 2 Drawing Sheets

DATA CARRIER-CONTROLLED TERMINAL IN A DATA EXCHANGE SYSTEM

BACKGROUND OF THE INVENTION

The invention concerns a data exchange system terminal controlled by portable data carriers, the terminal having several connection units for the connection of exchangeable user data carriers as well as other exchangeable data carriers, and also having at least one data input unit and a circuit means for assuring the performance of identity and authenticity tests.

Data exchange systems with terminals of this type are in constant development to achieve ever more numerous and more versatile uses. Above all, systems with user data carriers in the form of cards with built-in active, integrated semi-conductor circuits (so called chip cards) make possible ever more complex uses in expanded data networks, so that in most cases the trustworthiness and the secrecy of the data transmission takes on preeminent importance. To achieve a reduction in the transmission of large amounts of data (perhaps over large distances), there is a strong tendency to decentralize, that is to relocate data processing functions from central computers of the system to local terminals (generally existing in multiple numbers).

This requires, however, correspondingly more expensive and costly terminals, and to a similar extent also increases the risk of undesired manipulation and unauthorized access to secret data through the terminals. In this respect certain circuit parts are critical, these being those which undertake the testing of identity (authorization of a user to use a given data carrier) and of authenticity (that is the "genuiness" of a data carrier belonging to the system), because such decentralized testing presupposes the storage of secret test keys in the terminals.

Terminals of the aforementioned type with several connecting units for the connection of exchangeable data carriers are, for example, known from U.S. Pat. No. 4,450,535, FIG. 1, or from U.S. Pat. No. 4,809,326. In these devices the circuit means for carrying out the identity and authenticity tests are fixed components of the devices, that is they are built into the terminal, and in them the specific operational program is also stored. For performing the mentioned test procedures the secret test keys and if necessary further secret data must be read out of the exchangeable data carrier and temporarily stored in the device. This therefore results in an expensive and not very flexible construction of the device, and above all the devices are susceptible to unauthorized data access and fraudulent manipulation.

SUMMARY OF THE INVENTION

The present invention has therefore as its object the simplification of the design and construction of complex terminals for decentralized versatile use, and at the same time the decrease of critical security risk.

This object is solved in accordance with the invention by means of a terminal of the aforementioned type wherein the mentioned circuit means of the device are accommodated in at least one further exchangeable data carrier formed as a microprocessor containing control module and which, in connection with a control and computer means, is mechanically as well as cryptographically protected against unauthorized reading of the protected memory are which receives the secret test keys and other secret data as well as application specific programs. This device and concept make possible a far reaching modular method of construction and with it a simple, cost-effective and application independent manufacture of multiple function terminals. Moreover the "modularization" implies high security against data access and manipulation at the device similar to that of microprocessor containing user cards, whereby the construction of largely automatic terminals—and correspondingly important saving in remote data transmission—is made possible without increased risk.

A number of preferred embodiments of terminals as well as accompanying control modules are possible.

BRIEF DESCRIPTION OF THE DRAWINGS

Further features of the invention appear in the following description of exemplary embodiments taken in connection with the drawings. The drawings show.

DESCRIPTION OF THE PREFERRED EMBODIMENTS

Figure 1:
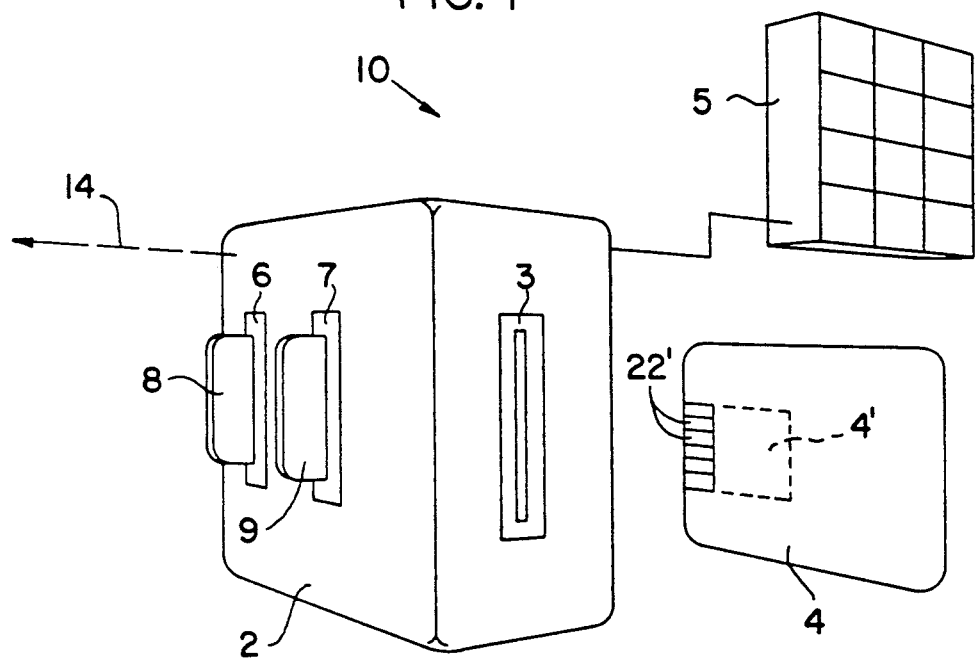
FIG. 1 a general view of an exemplary terminal embodying the invention.

The terminal 10 of a data exchange system, such as illustrated in FIG. 1, finds use for example as a so-called "point of sale" POS device or for example as an entrance control device or the like. The terminal 10 is controlled by portable exchangeable user data carriers 4, here provided in the form of plug cards each having galvanized contacts 22' and equipped with an active, integrated semiconducting circuit 4' (so-called chipcards with one or more semiconductor components). As a connection unit for the connection of the exchangeable user data carriers 4 a contact unit 3 is provided which, as illustrated, can be built into a read-/write station 2. A data input unit to be operated by the user is illustrated as a key block 5 made separate from the station 2 and connected with it by a conductor. A further data input unit (not seen in FIG. 1, illustrated in FIG. 2 at 5') can be provided for the operating personnel of the terminal (for example dealers, supervisors), just as customary alphanumeric indicating units for personnel and users can also be provided (not illustrated). External connections of the terminal to other units of the data exchange system, for example to a central computer, to other terminals etc., are illustrated at 14.

The terminal 10 has two other connecting units, formed as contact units 6 & 7, to each of which a control module 8 or 9, respectively, is connected. These control modules are exchangeable and are equipped with one or more microprocessor whose construction and function is further explained below. In the case of the use of user data carriers 4 in the form of contact equipped plug cards it is of advantage if in the terminal similar contact units 3, 6, 7 and similar associated drive circuits 13 (FIG. 2) are always used for the connection of the plug card 4 as well as for the connection of the control modules 8, 9. In this case all exchangeable control modules are also provided with a plug contact arrangement 22 (FIG. 3) corresponding in size and in contact layout with that of the plug card 4.

The individual exchangeable control modules available for the terminal 10 can be arranged in functionally special different groups according to the use assigned to the user data carriers. With reference to the arrangement at the device or to the exchangeability, different variations are possible according to application. Departing from FIG. 1, (in addition to the contact unit 3 for the user data carrier 4) only one single further contact unit can be provided by means of which different control modules can be interchangeably connected according to use. On the other hand, in case of a number of contact units 6, 7 several control modules 8, 9, as illustrated, can be connected simultaneously. A single available control module o several simultaneously connected control modules can be individually activated either by the manual input of data (at the unit 5 or 5') or automatically on the basis of identification data stored in the then connected user data carrier 4.

The individual functional units of the terminal 10 can naturally be arranged in different ways. Departing from FIG. 1, the contact unit 3, the data input unit 5 and if need be a display unit can be arranged in a "user console" separate from the other units of the device. According to need other contact units, for example for different types of user data carriers, can be provided. In case of a POS terminal at least one data input unit and one display unit are preferably arranged together in a "dealer" operating unit further connected to a known type of electrical data cash register (for payment). It may further be practical to arrange the control modules with their contact units spatially separate from the other functional units of the terminal.

Figure 2:
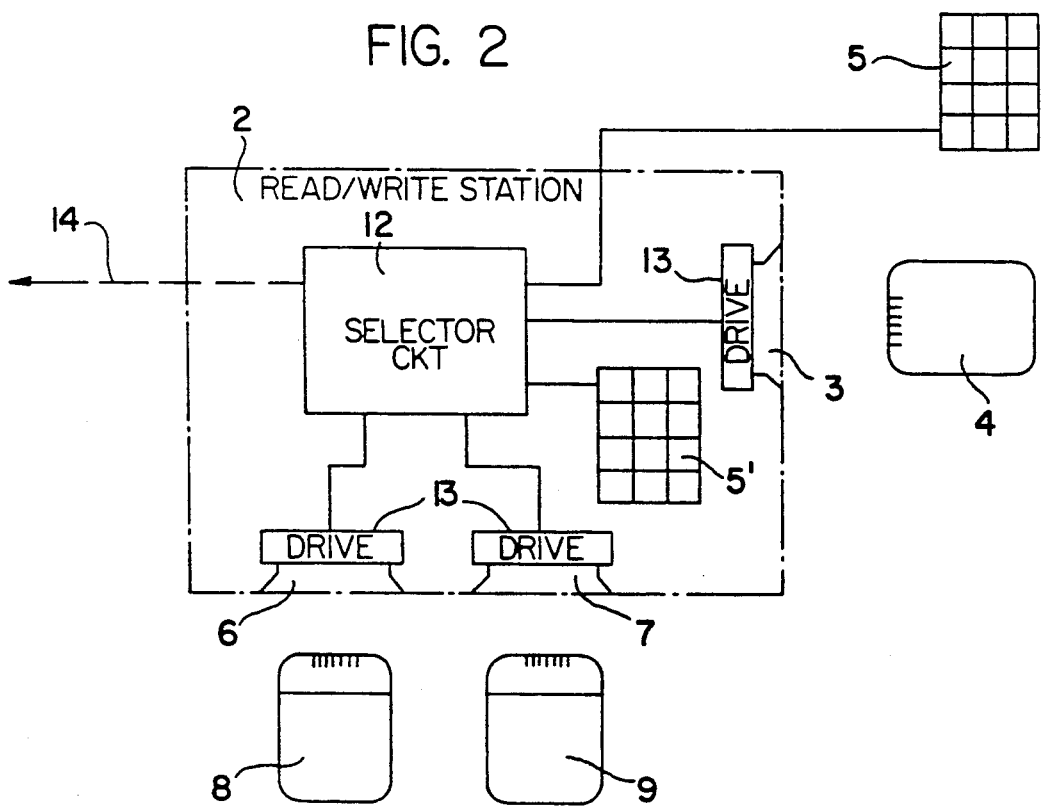
FIG. 2 a simplified block diagram of the device of FIG. 1.

An exemplary circuit construction of a terminal—related to the example of FIG. 1—is schematically illustrated in FIG. 2. The station 2 contains essentially a selector or commutator circuit 12, to which external connection conductors 14 as well as all functional units, such as data input units 5, 5' and drive circuits 13 for the contact units 3 or 6 and 7, of the terminal are connected. The selector circuit 12 forms essentially only the connection between the named functional units and the external system components. All circuit parts relevant to security, especially for the carrying out of identity and authenticity tests, as well as specific circuits and programs for the different data carrier types (for example card groups) are on the other hand housed in the microprocessors of the exchangeable control modules 8, 9 etc. Especially, the secret test keys for the mentioned tests are stored only in these control modules.

Figure 3:
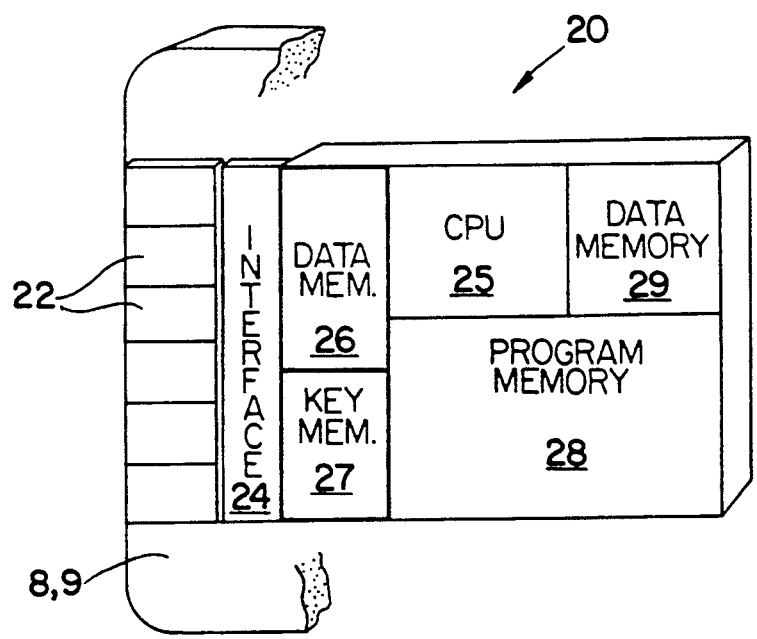
FIG. 3 a schematic illustration of an exemplary construction of a microprocessor in an exchangeable control module.

A possible construction of the microprocessor of a control module is schematically illustrated in FIG. 3 (the integrated semiconductor circuit is preferably but not necessarily arranged on a single chip). Connected to the contact arrangement 22 is an interface area 24 for the cryptographically secured exchange of data, whereby a special (additional) computer means can be provided for carrying out the highly developed cryptographic method inside of the processor. The actual control and computer means of the microprocessor is illustrated by the area 25. The control and computer means (CPU) 25 are associated with different memory areas 26 to 29. Included in these is an area 26 for storing data to be maintained in secrecy and an area 27 for storing cryptographic test keys (identity and authenticity tests) especially cryptographically protected with respect to access. For other data which are not to be especially protected a memory area 29 is provided, and in the area 28 are stored operational programs for the data and command exchange, which are specific to the immediate application (system application, type of terminal, type of user data carrier, etc).

Every communication over the circuit 12 (FIG. 2) from and to the control modules 8, 9—in the case of chip cards also from and to the user data carriers 4—is protected by cryptographic methods (symmetric and/or asymmetric cryptographic methods such as for example DES, data encryption standards, RSA-method, etc.). The use of these cryptographic methods in the case of coding and decoding, authorizing, authenticating as well as forming and testing electronic characters (such as for example "message authentication codes", "authentication identifier", "FAC File Authentication") takes place inside of the control module and if applicable inside the chip card. The secret keys required for this are only in existence in their protected memory areas. They are used exclusively inside of the control module and are not read out into the station 2. The same goes for the specific operational programs, that is the programs that actively control the entire test procedure, the data exchange operations, etc. Finally the protocol and/or updating processes in respect to the procedures carried out by means of the terminal can take place inside of the control module in memory areas provided therefor.

The use of a main key or keys derived therefrom in a control module, which keys are respectively specific to a designated group or to a certain type of user data card, makes possible the automatic identification and activation of a given control module as soon as a data carrier 4 of the involved type comes into play. On the other hand a module can also he activated by means of manual data input, for example by an operator of the unit 5' of the terminal. It can especially be provided that a certain control module is so secured against unauthorized use that its activation is only possible by the input of a secret code (for example PIN).

An especially advantageous and additional security is naturally obtained in that during the time periods in which the terminal is not activated and remains unsupervised the control module can be taken away and kept in a secure place, for example in a safe, which naturally cannot be done with the entire device. In the control module the integrated semiconductor components are moreover embedded and protected mechanically, chemically and physically (with same techniques known in connection with chip cards)—the that is an unauthorized attempt to free a component of the module (for example of a stolen control module) leads without fail to the disability or destruction or loss of the secret data.

On the other hand the terminal is naturally not functional without an inserted control module. Since it contains no secret data or circuit parts for cryptographic operations and no memory for such data, keys or other information, an unpermitted access to the station 2 can at most influence the ability of the station 2 to function, but it does not bring security into question. The terminal for this reason therefore requires, when not being operated and when the control modules are removed and safely stored, no special attention or expensive security measures.

With the described modular construction in which all of the circuit parts and data relevant to security are contained in the control module an extremely high security against unauthorized access to secret data and against fraudulent manipulation of the terminal is achieved. Moreover, the device can be assembled practically exclusively from standard components independently of the intended use whereby its manufacture is substantially simplified and reduced in cost. It is finally to be noted that the described construction methods are naturally not only usable in connection with chip cards, but also with other types of user data carriers, such as magnetic strip cards, optical cards, etc. or data carriers with combined memory techniques (so-called hybrid cards). Instead of connecting units (for the cards as well as for the module connection) with galvanized contacts other types of connecting techniques can also be used (for example, inductive, capacitive, optical, etc.). In such cases under "contact arrangement" of the user data carriers (plug cards) or of the modules corresponding connection and transmission means are to be understood.

I claim:

1. A terminal (10) in a data exchange system controlled by portable data carriers, the terminal having several connecting units for connection of exchangeable user data carriers (4) as well as other exchangeable data carriers, at least one data input unit (5) and circuit means for carrying out identity and authenticity tests, further characterized in that the mentioned circuit means of the terminal (10) is housed in at least one of the other exchangeable data carriers different from the exchangeable user data carriers and is formed as a control module, the circuitry means so housed including a control and computer means (25) as well as memory areas (26, 27, 28) mechanically and cryptographically protected against unauthorized reading for storing secret test keys and other secret data, as well as application specific operational programs for the terminal.

2. A terminal according to claim 1 further characterized in that one connection unit is provided for the selective connection of any one of a plurality of different control modules at a time.

3. A terminal according to claim 2 further characterized in that the circuit means so housed further includes means for individually activating the control modules from manual data input or identifying data stored in user data carriers (4).

4. A terminal according to claim 1 further characterized in that several connecting units are provided for the connection of each one of the control modules.

5. A terminal according to claim 1 further characterized in that the user data carriers are plug cards (4) equipped with an integrated semi-conducting circuit (4').

6. A terminal according to claim 5 further characterized in that the connecting units and associated drive circuits (13) for the user data carriers and (4) for the data carrier housing said circuit means forming the control module (8, 9) are similar.

7. A terminal in a data exchange system as defined in claim 1 wherein a circuit within the terminal has a cryptographic communication link with at least one of the exchangeable data carriers.

8. A terminal in a data exchange system as defined in claim 1 wherein secret test keys required for the cryptographic communication link between the circuit within the terminal and said one of the exchangeable data carriers are used and reside only within said one of the exchangeable data carriers.

9. A control module for a terminal (10) in a data exchange system, the terminal having a first connecting unit (3) for at least one portable user data carrier and a second connecting unit, for another portable data carrier comprising:
a portable data carrier removable from and insertable in the second connecting unit and having circuit means housed therein for controlling the terminal, the circuit means including control and computer means (25) and memory areas mechanically and cryptographically protected against unauthorized reading for storing secret test keys and other secret data as well as an operational program which is application specific to the terminal.

10. A control module according to claim 9 for a terminal (10) controlled by a portable user data carrier (4) having a plug contact received by the first connecting unit, further characterized in that the data carrier which comprises the control module has a plug contact arrangement (22) which in size and layout corresponds to that (22') of the user data carriers (4).

* * * * *

(12) EX PARTE REEXAMINATION CERTIFICATE (7367th)
United States Patent
Scwartz

(10) Number: US 5,093,862 C1
(45) Certificate Issued: Feb. 16, 2010

(54) DATA CARRIER-CONTROLLED TERMINAL IN A DATA EXCHANGE SYSTEM

(75) Inventor: Hermann Scwartz, Pfäffikon (CH)

(73) Assignee: Spa Syspatronic AG, Zug (CH)

Reexamination Request:
No. 90/009,005, Jan. 28, 2008

Reexamination Certificate for:
Patent No.: 5,093,862
Issued: Mar. 3, 1992
Appl. No.: 07/381,510
Filed: Jul. 18, 1989

(51) Int. Cl.
*G06Q 20/00* (2006.01)

(52) U.S. Cl. ................ 705/65; 235/380; 235/382; 340/5.74; 705/73

(58) Field of Classification Search .............. None
See application file for complete search history.

(56) References Cited

U.S. PATENT DOCUMENTS

| | | | |
|---|---|---|---|
| 4,105,156 A | 8/1978 | Dethloff |
| 4,211,919 A | 7/1980 | Ugon |
| 4,218,582 A | 8/1980 | Hellman et al. |
| 4,278,837 A | 7/1981 | Best |
| 4,453,074 A | 6/1984 | Weinstein |
| 4,513,389 A | 4/1985 | Devchoudhury |
| 4,575,621 A | 3/1986 | Dreifus |
| 4,593,384 A | 6/1986 | Kleijne |
| 4,614,861 A | 9/1986 | Pavlov et al. |
| 4,689,478 A | 8/1987 | Hale et al. |
| 4,697,072 A | 9/1987 | Kawana |
| 4,697,073 A | 9/1987 | Hara |
| 4,709,136 A | 11/1987 | Watanabe |
| 4,734,568 A | 3/1988 | Watanabe |
| 4,742,215 A | 5/1988 | Daughters et al. |
| 4,799,061 A | 1/1989 | Abraham et al. |
| 4,802,218 A | 1/1989 | Wright et al. |
| 4,809,326 A | 2/1989 | Shigenaga |
| 4,823,388 A | 4/1989 | Mizutani et al. |
| 4,827,512 A | 5/1989 | Hirokawa et al. |
| 4,874,935 A | 10/1989 | Younger |
| 4,961,142 A | 10/1990 | Elliott et al. |
| 4,982,069 A | 1/1991 | Kayanakis |
| 4,985,921 A | 1/1991 | Schwartz |
| 5,014,311 A | 5/1991 | Schrenk |
| 5,153,581 A | 10/1992 | Hazard |

FOREIGN PATENT DOCUMENTS

| | | |
|---|---|---|
| DE | 27 38 113 A1 | 3/1978 |
| DE | 28 43 583 A1 | 5/1979 |
| DE | 36 31 992 A1 | 11/1987 |
| DE | 37 36 190 A1 | 5/1988 |
| EP | 0111381 B1 | 6/1984 |

(Continued)

OTHER PUBLICATIONS

Eckelmann, "Transputer der 2. generation," Elektronik, vol. 18, pp. 61–70 (Sep. 4, 1987).

(Continued)

*Primary Examiner*—Minh T Nguyen

(57) ABSTRACT

A terminal (10) in a data exchange system with exchangeable portable user data carriers (4) has for their connection at least one connecting unit (3) and has further at least one data input unit (5). Exchangeable control modules (8, 9) are connected through one or more other, preferably similar, connecting units (6, 7). The modules are equipped with microprocessors and contain mechanically and cryptographically protected memory areas which receive secret data and keys for the secure carrying out of identity and authenticity tests, as well as application specific operational programs. These construction methods offer high security against unauthorized data access as well as against fraudulent manipulation of the device. They also greatly simplify the application independent design and construction of the terminal.

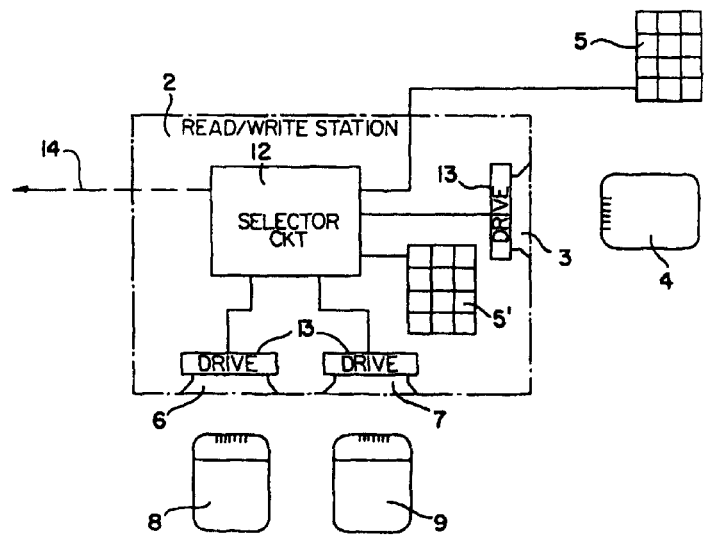

FOREIGN PATENT DOCUMENTS

| | | |
|---|---|---|
| EP | 0 152 024 A2 | 8/1985 |
| EP | 0 193 856 A2 | 8/1986 |
| EP | 0193920 A2 | 9/1986 |
| EP | 0 207 320 A2 | 1/1987 |
| EP | 0 218 176 A2 | 4/1987 |
| EP | 0 262 036 A1 | 3/1988 |
| EP | 0305004 A1 | 3/1989 |
| EP | 0 337 185 A2 | 10/1989 |
| FR | 2 592 502 A1 | 7/1987 |
| WO | WO 87/05420 A1 | 9/1987 |
| WO | WO 88/01818 | 3/1988 |
| WO | WO 88/03297 | 5/1988 |

OTHER PUBLICATIONS

Ingegra Systems, Inc., "Complete EFT/POS transaction systems integration services," 1987. (Available at http://www.derekspratt.com/PDFs/Business/Integra%20Systems/Integra%20Systems%20Transaction%20Processor%20Brochure.pdf).

Integra Systems, Inc., "SoftTerm: The ultimate transaction terminal," (Available at http://www.derekspratt.com/PDFs/Business/Integra%20Systems/Integra%20Systems%20SofTerm%20Brochure.pdf).

Keil, in Mikrocomputer, Foreword and pp. 210–211 (Siemens AG, Feb. 1987).

Schrenk, "Novel chip card concept with the 'intelligent' SLE 4401K memory chip," Siemens AG Telecom Report, vol. 9, No. 1, pp. 88–91 (1986).

Spratt, "Integra Systems / Canysco—Overview and history: An early innovator in credit and debt card financial transaction processing," http://www.derekspratt.com/HTML/Business/Other/Integra_Overview.html (last visited Apr. 3, 2009).

Schrenk, H., "Novel Chip Card Concept with the 'Intelligent' SLE 4401K Memory Chip," Telecom Report, Siemens AG, Components Division, Munich, 1986, vol. 9, No. 1, pp. 88–91 (and English translation).

Chip Card News—International Association for Microcircuit Cards, No. 5, Apr. 1983.

*Smart credit cards: the answer to cashless shopping?* S.R. Weinstein, IEEE Spectrum, Feb. 1984, pp. 43–49.

Svigals, Jerome, Smart Cards: The Ultimate Personal Computer, 1985, Macmillan Publishing Company (The year of publication is sufficiently earlier than the effective U.S. filing date and any foreign priority date so that the month of publication is not an issue.)

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *